United States Patent
Radostev et al.

(10) Patent No.: US 11,705,108 B1
(45) Date of Patent: Jul. 18, 2023

(54) VISUAL RESPONSES TO USER INPUTS

(71) Applicant: Amazon Technologies, Inc., Seattle, WA (US)

(72) Inventors: Vasiliy Radostev, Seattle, WA (US); Ruhi Sarikaya, Redmond, WA (US); Rekha Seshadrinathan, Redmond, WA (US); Abhinav Sethy, Seattle, WA (US); Chetan Nagaraj Naik, Seattle, WA (US); Anjishnu Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/547,586

(22) Filed: Dec. 10, 2021

(51) Int. Cl.
*G10L 13/08* (2013.01)
*G10L 15/183* (2013.01)
*G10L 15/06* (2013.01)
*G10L 15/08* (2006.01)

(52) U.S. Cl.
CPC ............ *G10L 13/08* (2013.01); *G10L 15/063* (2013.01); *G10L 15/083* (2013.01); *G10L 15/183* (2013.01)

(58) Field of Classification Search
CPC ..... G10L 13/08; G10L 15/063; G10L 15/083; G10L 15/183
USPC ........................................................ 704/260
See application file for complete search history.

(56) References Cited

U.S. PATENT DOCUMENTS

| | | | |
|---|---|---|---|
| 6,144,938 A | 11/2000 | Surace et al. | |
| 7,027,832 B2 | 4/2006 | Gum | |
| 7,502,738 B2 | 3/2009 | Kennewick et al. | |
| 9,318,108 B2 | 4/2016 | Gruber et al. | |
| 9,589,565 B2 | 3/2017 | Boies et al. | |
| 10,049,663 B2 | 8/2018 | Orr et al. | |
| 10,418,033 B1 | 9/2019 | Mutagi et al. | |
| 11,257,495 B2 * | 2/2022 | Mutagi | G10L 17/22 |
| 11,527,237 B1 * | 12/2022 | Sarikaya | G10L 13/08 |
| 11,568,863 B1 * | 1/2023 | Sarikaya | G10L 15/22 |
| 2003/0167167 A1 | 9/2003 | Gong | |
| 2005/0091057 A1 | 4/2005 | Phillips et al. | |
| 2007/0038436 A1 | 2/2007 | DiCristo et al. | |

(Continued)

OTHER PUBLICATIONS

The Examiner's attention is hereby drawn to the specification and file history of co-pending U.S. Appl. No. 16/569,780, titled "Configurable Output Data Formats," filed Sep. 13, 2019, which may contain information relevant to the present application.

*Primary Examiner* — Susan I McFadden
(74) *Attorney, Agent, or Firm* — Pierce Atwood LLP

(57) ABSTRACT

Techniques for generating a visual response to a user input are described. A system may receive input data corresponding to a user input, determining a first skill component is to determine a response to the user input, and determine a second skill component is to determine supplemental content related to the user input. The system may also determine a template for presenting a visual response to the user input, where the template is configured for presenting the response and the supplemental content. The system may receive, from the first skill component, first image data corresponding to the first response. The system may also receive, from the second skill component, second image data corresponding to the first supplemental content. The system may send, to a device including a display, a command to present the first image data and the second image data using the template.

20 Claims, 9 Drawing Sheets

(56) References Cited

U.S. PATENT DOCUMENTS

| | | |
|---|---|---|
| 2014/0006030 A1 | 1/2014 | Fleizach et al. |
| 2015/0081294 A1 | 3/2015 | Hsu et al. |
| 2015/0279357 A1 | 10/2015 | Paxinos et al. |
| 2015/0348549 A1* | 12/2015 | Giuli ................... G10L 15/1822 704/235 |
| 2015/0348551 A1 | 12/2015 | Gruber et al. |
| 2016/0093285 A1 | 3/2016 | Christian et al. |
| 2017/0236509 A1 | 8/2017 | Pulz et al. |
| 2018/0122361 A1 | 5/2018 | Silveira Ocampo |
| 2022/0093093 A1* | 3/2022 | Krishnan ................ G10L 15/08 |
| 2022/0093094 A1* | 3/2022 | Krishnan ............. G06V 40/161 |
| 2022/0093101 A1* | 3/2022 | Krishnan ................ G10L 15/20 |

\* cited by examiner

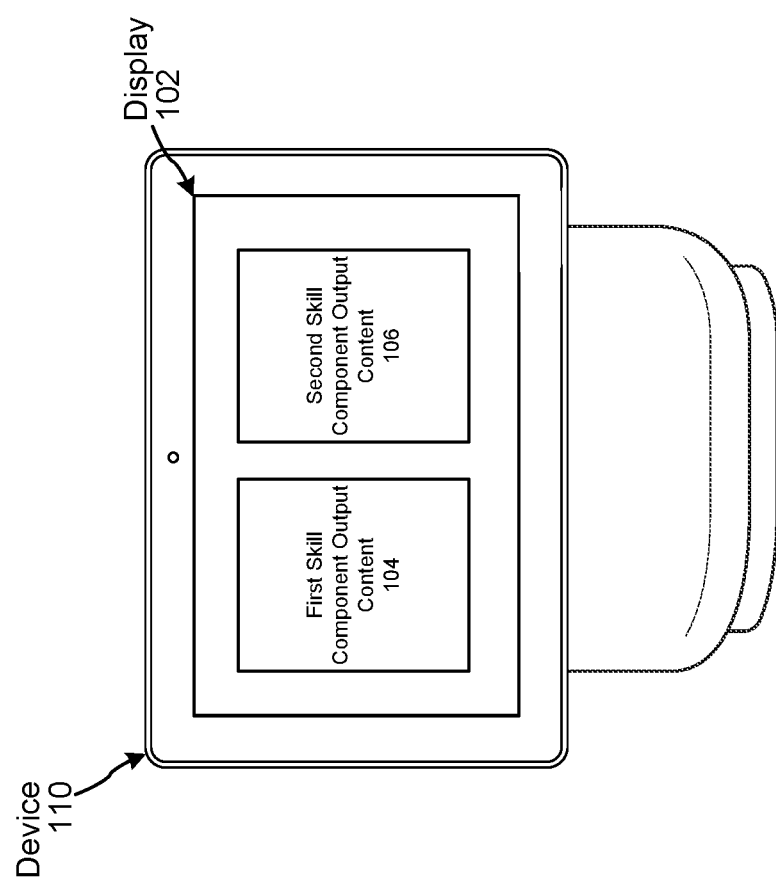

and NLU are often used together as part of a language processing component of a system. Text-to-speech (TTS) is a field of computer science concerning transforming textual and/or other data into audio data that is synthesized to resemble human speech.

VISUAL RESPONSES TO USER INPUTS

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates an example display of a device presenting content, provided by two separate skill components, in response to a single user input, according to embodiments of the present disclosure.

DETAILED DESCRIPTION

Figure 1B:
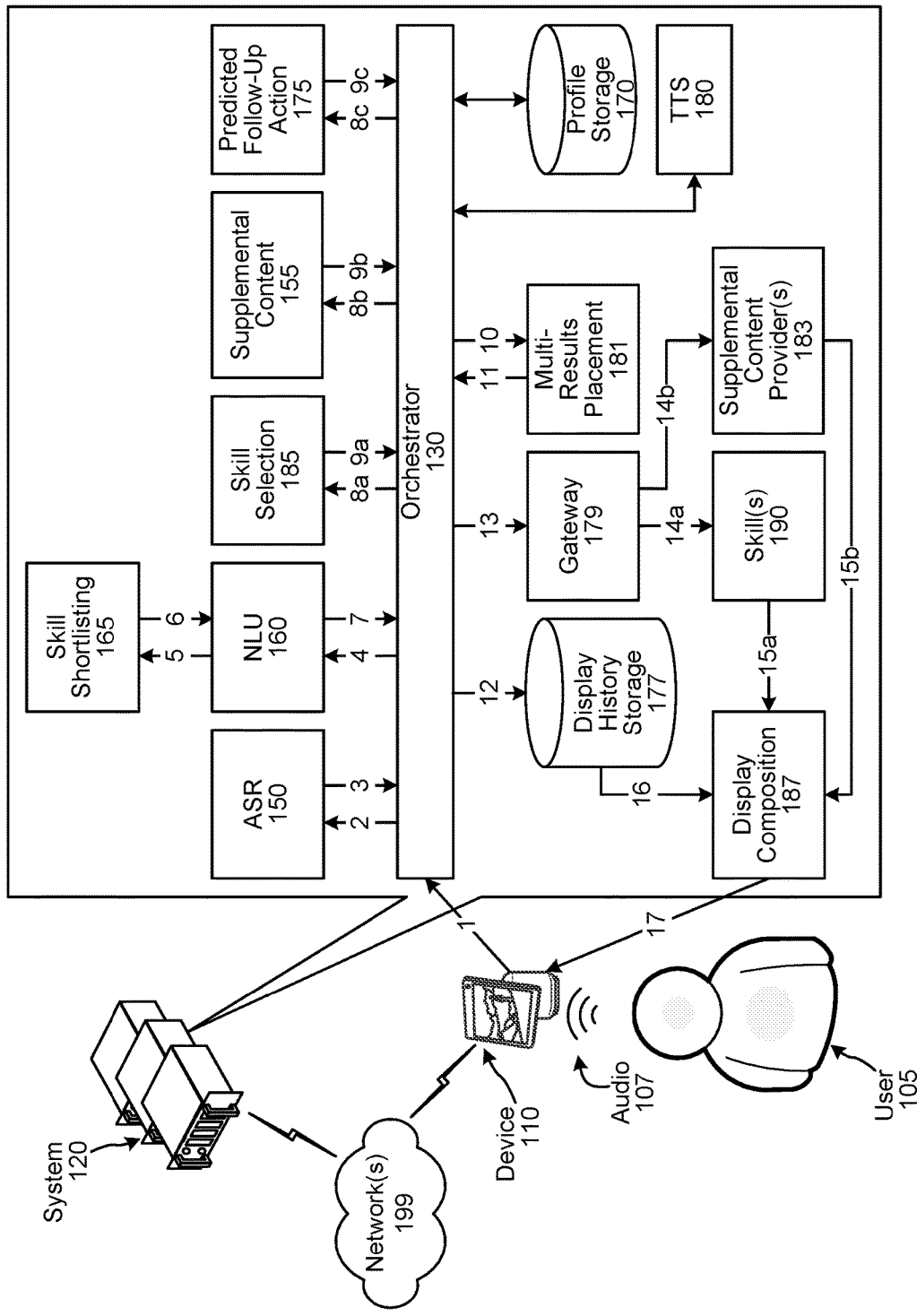
FIG. 1B is a conceptual diagram illustrating a system for visually presenting multiple results in response to a single user input, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A device may output synthesized speech in response to a spoken user input including a wakeword, e.g., Alexa, and a command. For example, in response to the spoken user input "Alexa, how many calories are in an avocado," a device may output the calories in an avocado as synthesized speech. For further example, in response to the spoken user input "Alexa, what is the weather," a device may output today's weather as synthesized speech.

In some instances, a device may also, in response to a spoken user input, present visual content on a display. For example, in response to the spoken user input "Alexa, how many calories are in an avocado," a device may display an image of an avocado with text corresponding to the amount of calories. For further example, in response to the spoken user input "Alexa, what is the weather," a device may display an image representing the type of weather, e.g., sunny, cloudy, rainy, etc., along with text of a high temperature to be experienced.

In each of the above examples, the device may present, as synthesized speech and/or displayed content, an output generated by a single skill component. As used herein, a "skill component" may refer to software, that may be placed on a machine or a virtual machine, e.g., software that may be launched in a virtual instance when called, configured to process NLU output data, i.e., including an intent, and perform one or more actions in response thereto. Continuing the above examples, a food skill may provide the calories in an avocado and/or the image of an avocado with the text corresponding to the calories, and, as another example, a weather skill may provide the weather information and/or the image representing the type of weather along with the text corresponding to the high temperature.

In some embodiments, outputs of multiple skill components can be incorporated in a single visual response to spoken natural language and other types of user inputs. For example, a visual response may include outputs from multiple skill components all corresponding to a single domain. As another example, a visual response may include output from skill components corresponding to different domains. As used herein, a "domain" may refer to a collection of related functionality, such as various skills able to play music (e.g., Amazon Music skill, Spotify skill, Apple Music skill, Pandora skill, etc.). A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), advertising domain, payments domain, information domain, and a shopping domain (corresponding to shopping functionality).

According to the present disclosure, when a system receives a user input, the system determines at least an intent representing the user input. After determining the intent, a set of components to generate candidates for providing visual data for presentment regarding the instant user input. The set of components may include a skill selection component, a supplemental content component, a predicted follow-up action component, and potentially other components/systems. The skill selection component determines an n-best list of skill components to generate a response to the user input. The supplemental content component may determine one or more supplemental content providers to generate supplemental content for output, or may determine no supplemental content providers are to generate supplemental content for the instant user input. As used herein, "supplemental content" may refer to visual content, e.g., an image or video, that relates to the user input but which may not be directly responsive to the user input. For example, if the user input requests calories in an avocado, supplemental content may correspond to a recipe including avocado as an ingredient. As another example, if the user input requests calories in an avocado, supplemental content may include fat and fiber in an avocado. Given the variety of options and limited screen space, the system can be configured to optimize one type of supplemental content over another based on various contextual data, such as the particular user making the request (as determined through speaker identification, facial recognition, etc.), time of day, historical data of other requests from the same device/user account, etc. In some situations, the system may choose to discard all supplemental content, thereby optimizing for more user attention to content responsive to the instant user input. The predicted follow-up action component determines one or more follow-up actions corresponding to one or more user inputs expected to be received follow output of the response to the instant user input. For example, if the instant user input requests traffic information, a predicted follow-up action may be output of weather information, as a user may often request weather information after requesting traffic information.

The system is configured with a multi-results placement component configured to receive the outputs of the skill selection component, the supplemental content component, and the predicted follow-up action component, and determine which of the outputs should be displayed. The multi-response placement component may determine an amount of visual content to be presented, and how the visual content is to be configured when presented, based on user preferences, device screen size, conversation context, and skill capability.

The multi-results placement component may implement a machine learning (ML) model to determine which skill(s) and/or supplemental content provider(s) are to provide visual content. The ML model may also determine how, e.g., sizing, position, etc., the visual contents are to be configured in the output. The ML model may consider various data including, but not limited to, a preferred display composition as indicated by a skill component developer, user preferences, a size of the display to be used to present the visual contents, and context corresponding to a dialog including an instant user input. In some embodiments, the ML model may be a contextual bandit model.

After the multi-results placement component makes the above determinations, the system may invoke the skill(s) and/or supplemental content provider(s) to provide the visual content to be included in the visual output to the user. The system may send, to a device, a command to present the visual content according to the output of the ML model, resulting in the device simultaneously displaying the visual outputs of multiple sources in response to the single user input.

Teachings of the present disclosure provide, among other things, an improved user experience by visually presenting a direct response to a user input as well as one or more visual contents that relate to the user input and which may be useful to the user.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates an example of how a device 110 may present, via a display 102, content, provided by two separate skill components, in response to a single user input. First skill component output content 104 may be responsive to the user input. Second skill component output content 106 may be a further response to the user input, or may be supplemental content related to, but not necessarily directly responsive to, the user input. The placement, sizing, etc. of the first skill component output content 104 and the second skill component output content 106 may be configured based on various factors such as, but not limited to, a preferred display composition as indicated by a skill component developer, user preferences, a size of the display 102, context corresponding to a dialog including the user input, etc. In some embodiments as described herein, a multi-armed bandit ML model may be used to optimize the configuration of the displayed contents.

FIG. 1B illustrates a system 100 for visually presenting multiple results in response to a single user input. Although the figures and discussion of the present disclosure illustrate certain steps in a particular order, the steps described may be performed in a different order (as well as certain steps removed or added) without departing from the present disclosure.

As illustrated, the system 120 may include the device 110, local to a user 105, in communication with a system 120 via a network(s) 199. The network(s) 199 may include the Internet and/or any other wide- or local-area network, and may include wired, wireless, and/or cellular network hardware.

The user 105 may speak an input, and the device 110 may receive audio 107 representing the spoken user input. For example, the user 105 may say "Alexa, what is the weather" or "Alexa, book me a plane ticket to Seattle." In other examples, the user 105 may provide another type of input, e.g., selection of a button, selection of one or more displayed graphical interface elements, perform a gesture, etc. The device 110 may send (step 1) input data to the system 120 for processing. In examples where the user input is a spoken natural language input, the input data may be audio data. In other examples, the input data may be text data, e.g., represents a selected button or graphical user interface element(s), or image data, e.g., corresponding to a performed gesture.

In some embodiments, a microphone or array of microphones (of or otherwise associated with the device 110) may continuously capture the audio 107, and the device 110 may continually process audio data, representing the audio 107 as it is continuously captured, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data representing the audio 107, the device 110 may determine if the speech is directed at the device 110. In some embodiments, such determination may be made using a wakeword detection component. The wakeword detection component may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword.

Thus, the wakeword detection component may compare the audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component XXJ20 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component detects a wakeword, the device 110 may "wake" and send (step 1), to the system 120, the input audio data representing the spoken user input.

The system 120 may include various components to facilitate processing of the user input. For example, the system may include an automatic speech recognition (ASR) component 150, a natural language understanding (NLU) component 160, a skill shortlisting component 165, a skill selection component 185, a supplemental content component 155, a predicted follow-up action component 175, a display history storage 177, a gateway component 179, a multi-results placement component 181, a supplemental content provider(s) 183, a skill component(s) 190, a display composition component 187, a TTS component 180, and a profile storage 170.

The orchestrator component 130 may receive (step 1) the input data from the device 110. In the case that the input data is audio data, the orchestrator component 130 may send (step 2) the input audio data to the ASR component 150. The ASR component 150 may process the input audio data to determine ASR output data including one or more ASR hypotheses corresponding to the words included in the spoken user input. Details of how the ASR component 150 may process are described herein below.

The ASR component 150 may send (step 3) the ASR output data to the orchestrator component 130. The orchestrator component 130 may send (step 4) the ASR output data to the NLU component 160, which may in turn send the ASR output data to the skill shortlisting component 165.

The skill shortlisting component 165 may determine skill component identifiers corresponding to skill components most likely configured to process the user input. Details how of the skill shortlisting component 165 may be configured are described herein below. The skill shortlisting component 165 sends (step 6) the skill component identifiers to the NLU component 160.

The NLU component 160 performs NLU processing, with respect to the received skill component identifiers, to determine NLU output data including one or more NLU hypotheses, where a NLU hypothesis includes an intent, one or more entity types, and one or more corresponding entity values. Details of how the NLU components 160 may be configured are described herein below.

The NLU component 160 sends (step 7) the NLU output data to the orchestrator component 130. The orchestrator component 130 may send the NLU output data to multiple components of the system 120. For example, as illustrated in FIG. 1B, the orchestrator component 130 may send (step 8a) the NLU output data to the skill selection component 185, may send (step 8b) the NLU output data to the supplemental content component 155, and may send (step 8c) the NLU output data to the predicted follow-up action component 175. The orchestrator component 130 may send the NLU output data to the skill selection component 185, the supplemental content component 155, and the predicted follow-up action component 175 such that the skill selection component 185, the supplemental content component 155, and the predicted follow-up action component 175 are able to process at least partially in parallel.

The skill selection component 185 may process the NLU output data, and optionally other data, to determine one or more skill selection candidates. At a minimum, a skill selection candidate may include a skill component identifier corresponding to a skill component configured to process to respond to the user input. For example, if the user input is "when is the next [artist name] concert," the skill component candidate may include a skill component identifier corresponding to a concert listing skill component. Details of how the skill selection component 185 may be configured are described herein below.

The supplemental content component 155 may process the NLU output data, and optionally other data relating to the device 110 and/or the user 105, to determine one or more supplemental content candidates. At a minimum, a supplemental content candidate may include a supplement content provider identifier corresponding to a particular supplemental content provider configured to provide supplemental content for output in conjunction with the response to the user input. For example, if the user input is "when is the next

[artist name] concert," the supplemental content candidate may include a supplemental content provider identifier corresponding to music component configured to output music of the indicated artist name. In some embodiments, the music component may be a music skill component. In some embodiments, a supplemental content provider may be a skill component. In some embodiments, a supplemental content candidate may include a requested display placement where the supplemental content should be presented. In some embodiments, a supplemental content candidate may include a placement condition. Example placement conditions include, but are not limited to, "display the supplemental content only if X" and "display the supplemental content if not Y." Details of how the supplemental content component 155 may be configured are described herein below with respect to FIG. 5.

The predicted follow-up action component 175 is configured to determine a user's latent goal and predict the user's next action. The predicted follow-up action component 175 may process the NLU output data, and optionally other data relating to the device 110a and/or the user 105, to determine one or more predicted follow-up action candidates. For example, the predicted follow-up action component 175 may determine usage history data associated with a user identifier of the user 105, where the usage history data includes, at a minimum, NLU output data representing previous user inputs of the user 105. The predicted follow-up action component 175, may determine the instant NLU output data in the usage history data, determine one or more instances of NLU output data corresponding to subsequent user inputs to the instant NLU output data in the usage history data, and determine the one or more instances of NLU output data as corresponding to one or more predicted next actions of the user 105.

At a minimum, a predicted follow-up action candidate may include a predicted follow-up action, e.g., as represented by NLU output data, but at least an intent, and a skill component identifier corresponding to a skill component configured to perform the predicted follow-up action, i.e., configured to process the NLU output data, or intent. For example, if the user input is "when is the next [artist name] concert," the predicted follow-up action candidate may include NLU output data including a <NextConcert> intent, an entity type of "artist," and an entity value of "[artist name]"; and may also include a skill component identifier corresponding to a ticketing skill component configured to output concert ticket prices. In some embodiments, a predicted follow-up action candidate may include a requested display placement where an indicator, e.g., text or an image, of the predicted follow-up action should be presented. In some embodiments, a predicted follow-up action candidate may include a placement condition. Example placement conditions include, but are not limited to, "display the predicted follow-up action only if X" and "display the predicted follow-up action if not Y."

The orchestrator component 130 may receive (step 9a) the skill component candidate(s) from the skill selection component 185. The orchestrator component 130 may also receive (step 9b) the supplemental content candidate(s) determined by the supplemental content component 155 and/or receive (step 9c) the predicted follow-up action candidate(s) determined by the predicted follow-up action component 175. In some instances, the supplemental content component 155 may determine supplemental content is not to be output with respect to the instant user input. In such instances, the supplemental content component 155 may not output any supplemental content candidates at step 9b. In some instances, the predicted follow-up action component 175 may not determine a predicted follow-up action to the instant user input. In such instances, the predicted follow-up action component 175 may not output any predicted follow-up action candidates at step 9c. The orchestrator component 130 sends (step 10) the skill component candidate(s), and the supplemental content candidate(s) (to the extent such is received at step 9b) and/or the predicted follow-up action candidate(s) (to the extent such is received at step 9c), to the multi-results placement component 181.

The multi-results placement component 181 is configured to evaluate the foregoing candidates and determine which components of the system should output visual content, as well as how the visual contents should be oriented in the visual response to the user input. Details of an illustrative configuration of the multi-results placement component 181 are described herein below with respect to FIG. 2.

The multi-results placement component 181 generates a screen composition plan, which is data including a layout template representing how visual contents are to be displayed, and component identifiers of the components to provide the visual contents for the visual response to the user input. In the screen composition plan, each component identifier may be associated with data representing a portion of a display, e.g., lower left side, left side, upper right side, upper portion, etc., allotted to present visual content provided by the component. In some embodiments, the screen composition plan may indicate a portion of a display as pixel dimensions. The multi-results placement component 181 sends (step 11) the screen composition plan to the orchestrator component 130.

The orchestrator component 130 may store (step 12) the screen composition plan in the display history storage 177, for later use by the display composition component 187 as described herein below. The orchestrator component 130 may be configured to invoke, at least partially in parallel, the various components, indicated in the screen composition plan, via the gateway component 179. The orchestrator component 130 may send (step 13), to the gateway component 179, the screen composition plan generated by the multi-results placement component 181, and the NLU output data generated by the NLU component 160.

The gateway component 179 is configured to parse the screen composition plan to identify different portions of the screen composition plan corresponding to different components, and send the different screen composition plan portions to the different components along with the NLU output data. For example, the gateway component 179 may determine a portion of the screen composition plan corresponding to a skill component 190, and may send (step 14a), to the skill component 190, the portion of the screen composition plan and the NLU output data. For further example, the gateway component 179 may determine a portion of the screen composition plan corresponding to a supplemental content provider 183, and may send (step 14b), to the supplemental content provider 183, the portion of the screen composition plan and the NLU output data. While FIG. 1B illustrates the skill component(s) 190 being different from the supplemental content provider(s) 183, in some embodiments the supplemental content provider(s) 183 may be implemented as a skill component 190. To reduce user perceived latency, the gateway component 179 may invoke the skill component 190 and the supplemental content provider 183 in a manner that enables the skill component 190 and the supplemental content provider 183 to process at least partially in parallel.

The skill component 190 may process the received screen composition plan portion and the NLU output data to determine skill output data. Skill output data may include visual data, e.g., image data, video data, and/or text data, data indicating what should happen in response to receiving a user input requesting the scrolling of content, i.e., requesting addition content be presented, data indicating what should happen in response to receiving a user input selecting displayed visual data, etc. In some instances, the skill component 190 may receive a screen composition plan portion indicating the skill component 190 is to respond to the user input. In such instances, the skill component 190 may process the NLU output data to determine the skill output data to include text data configured to undergo TTS processing to generate output audio data including synthesized speech corresponding to the text data. For example, in the case of the user input "when is the next [artist name] concert," the text data may be "[artist name]'s next concert is [date]." In some instances, the skill component 190 may receive a screen composition plan portion indicating the skill component 190 is not to output the foregoing text data, e.g., in instances where the skill component 190 is to output supplement content with respect to the user input.

In addition, in instances where the skill component 190 receives a screen composition plan portion indicating the skill component 190 is to respond to the user input, the skill component 190 may process the NLU output data to determine the skill output data to include one or more instances of visual data, e.g., image data, video data, or text. The visual data, generated by the skill component 190, may depend on the screen composition plan portion received by the skill component 190. In some embodiments, the screen composition plan portion may indicate the skill component 190 is to output two instances of visual data: a first instance corresponding to a portion of a display allocated to the skill component 190, as indicated in the screen composition plan portion; and a second instance for presentment on an entirety of the display. For example, in the case of the user input "when is the next [artist name] concert," the first instance of visual data may correspond to an image of the concert venue with text corresponding to the date of the next concert, and the second instance of visual data may correspond to a smaller size version of the first instance of visual data. In some embodiments, the screen composition plan portion may indicate the skill component 190 is to output a single instance of visual data that is configured for presentment at a portion of the display allocated to the skill component 190, as indicated in the screen composition plan portion. For example, in the case of the user input "when is the next [artist name] concert," the foregoing single instance of visual data may correspond to an image of the artist with text corresponding to the date of the next concert.

In some situations as described herein below, presentment of the aforementioned visual data, on an entirety of the display, may be a plan adjuster screen rendering. Thus, it will be appreciated that a late binding decision for screen placement may be enabled by the skill component 190 providing both of the aforementioned first and second instances of visual data in the skill output data.

In some instances, a visual response to a user input may have two screens, a first screen that may be presented for a certain amount of time before transitioning to a second screen. The first screen may be fully populated by visual data output by the skill component 190 tasked with responding to the user input, and the second screen that is only partially populated by visual data output by the skill component 190. In some instances, the screen composition plan portion may indicate the skill component 190 is to output both instances of visual data.

The skill component 190 sends (step 15a) the skill output data to the display composition component 187.

The supplemental content provider 183 may process the received screen composition plan portion and the NLU output data to determine supplemental content provider output data including supplement content related to, but not directly responsive to, the user input. Since the supplemental content provider 183 is configured to output supplemental content, rather than a direct response to the user input, the supplemental content provider 183 may receive a screen composition plan portion indicating the supplemental content provider 183 is not to output text data for TTS processing. Rather, the supplemental content provider 183 may receive a screen composition plan portion indicating the supplemental content provider 183 is to output a single instance of visual data that is configured for presentment at a portion of the display allocated to the supplemental content provider 183, as indicated in the screen composition plan portion. For example, in the case of the user input "when is the next [artist name] concert," the foregoing single instance of visual data may correspond to text representing ticket prices for the concert. For further example, in the case of the user input "when is the next [artist name] concert," the foregoing single instance of visual data may correspond to text representing plane ticket prices to travel from the user's location to an airport near the concert venue. As another example, in the case of the user input "when is the next [artist name] concert," the foregoing single instance of visual data may correspond to text representing hotel room rates for hotels near the concert venue. The supplemental content provider may generate supplemental content provider output data including visual data, e.g., image data, video data, and/or text data, data indicating what should happen in response to receiving a user input requesting the scrolling of content, i.e., requesting addition content be presented, data indicating what should happen in response to receiving a user input selecting displayed visual data, etc.

The supplemental content provider 183 sends (step 15b) the supplemental content provider output data to the display composition component 187.

The display composition component 187 is configured to validate data, received from the skill component(s) and the supplemental content provider(s), against the screen composition plan stored in the display history storage 177 at step 12. In some embodiments, the display composition component 187 may receive the screen composition plan by querying (step 16) the display history storage 177 for a screen composition plan associated with an identifier of the instant user input and/or instant dialog. In some instances, the display composition component 187 may adjust the screen composition plan based on data received, or data not received, from the skill component(s) and/or the supplemental content provider(s). An illustrative configuration of the display composition component 187 is described herein below with respect to FIG. 4.

After the display composition component 187 validates or adjusts the screen composition plan, the display composition component 187 may cause (step 17) the device 110 to present visual content according to the screen composition plan, or adjusted screen composition plan. For example, the display composition component 187 may send, to the device 110, a command to present a visual output as indicated in the screen composition plan or adjusted screen composition plan, as well as the instances of visual data, received from the skill component(s) 190 and optionally supplemental content provider(s) 183, to be displayed according to the screen composition plan or adjusted screen composition plan. In some embodiments, the command may be sent in a separate data transmission from the instances of visual data and the screen composition plan. In response, the device 110 may present the visual content. In some embodiments, the device, that receives the data and presents the visual output at step 17, may be different from the device 110 that sends the input data to the system 120 at step 1. For example, the device that receives user input and sends the input data at step 1 may be configured without a display, and the device that receives the data for visual output may be a device configured with a display and associated with a same user and/or group profile as the displayless device.

The following is a more detailed discussion of that may be performed by various components of the system 120 mentioned above.

The ASR component 150 may process the input audio data to determine ASR output data including one or more ASR hypotheses corresponding to the words included in the spoken user input. An ASR hypothesis may be configured as a textual interpretation of the words, or may be configured in another manner, such as one or more tokens. Each ASR hypothesis may represent a different likely interpretation of the words spoken in the input audio data. Each ASR hypothesis may be associated with a score representing a confidence of ASR processing performed to determine the ASR hypothesis with which the score is associated.

The ASR component 150 interprets the speech in the input audio data based on a similarity between the audio data and pre-established language models. For example, the ASR component 150 may compare the input audio data with models for sounds (e.g., subword units, such as phonemes, etc.) and sequences of sounds to identify words that match the sequence of sounds of the speech represented in the input audio data.

The skill shortlisting component 165 is configured to determine a subset of skill components, executed by or in communication with the system 120, that may perform an action responsive to the spoken user input. Without the skill shortlisting component 165, the NLU component 160 may process ASR output data input thereto with respect to every skill component of or in communication with the system 120. By implementing the skill shortlisting component 165, the NLU component 160 may process ASR output data with respect to only the skill components that are likely to execute with respect to the user input. This reduces total compute power and latency attributed to NLU processing.

The skill shortlisting component 165 may include one or more ML models. The ML model(s) may be trained to recognize various forms of user inputs that may be received by the system 120. For example, during a training period, a skill component developer may provide training data representing sample user inputs that may be provided by a user to invoke the skill component. For example, for a ride sharing skill component, a skill component developer may provide training data corresponding to "get me a cab to [location]," "get me a ride to [location]," "book me a cab to [location]," "book me a ride to [location]," etc.

The system 120 may use the sample user inputs, provided by a skill component developer, to determine other potentially related user input structures that users may try to use to invoke the particular skill component. The ML model(s) may be further trained using these potentially related user input structures. During training, the skill component developer may be queried regarding whether the determined other user input structures are permissible, from the perspective of the skill component developer, to be used to invoke the skill component. The potentially related user input structures may be derived by one or more ML models, and may be based on user input structures provided by different skill component developers.

The skill component developer may also provide training data indicating grammar and annotations.

Each ML model, of the skill shortlisting component 165, may be trained with respect to a different skill component. Alternatively, the skill shortlisting component 165 may implement one ML model per domain, such as one ML model for skill components associated with a weather domain, one ML model for skill components associated with a ride sharing domain, etc.

The sample user inputs provided by a skill component developer, and potentially related sample user inputs determined by the system 120, may be used as binary examples to train a ML model associated with a skill component. For example, some sample user inputs may be positive examples, e.g., user inputs that may be used to invoke the skill component. Other sample user inputs may be negative examples, e.g., user inputs that may not be used to invoke the skill component.

As described above, the skill shortlisting component 165 may include a different ML model for each skill component, a different ML model for each domain, or some other combination of ML models. In some embodiments, the skill shortlisting component 165 may alternatively include a single ML model. This ML model may include a portion trained with respect to characteristics, e.g., semantic characteristics, shared by all skill components. The ML model may also include skill component-specific portions, with each skill component-specific portion being trained with respect to a specific skill component. Implementing a single ML model with skill component-specific portions may result in less latency than implementing a different ML model for each skill component because the single ML model with skill component-specific portions limits the number of characteristics processed on a per skill component level.

The portion, trained with respect to characteristics shared by more than one skill component, may be clustered based on domain. For example, a first portion, of the portion trained with respect to multiple skill components, may be trained with respect to weather domain skill components; a second portion, of the portion trained with respect to multiple skill components, may be trained with respect to music domain skill components; a third portion, of the portion trained with respect to multiple skill components, may be trained with respect to travel domain skill components; etc.

The skill shortlisting component 165 may make binary, e.g., yes or no, determinations regarding which skill components relate to the ASR output data. The skill shortlisting component 165 may make such determinations using the one or more ML models described herein above. If the skill shortlisting component 165 implements a different ML model for each skill component, the skill shortlisting component 165 may run the ML models that are associated with enabled skill components as indicated in a user profile associated with the device 110 and/or the user 105.

The skill shortlisting component 165 may generate an n-best list of skill components that may execute with respect to the user input represented in the ASR output data. The size of the n-best list of skill components is configurable. In an example, the n-best list of skill components may indicate every skill component of, or in communication with, the system 120 as well as contain an indication, for each skill component, representing whether the skill component is likely to execute the user input represented in the ASR output data. In another example, instead of indicating every skill component, the n-best list of skill components may only indicate the skill components that are likely to execute the user input represented in the ASR output data. In yet another example, the skill shortlisting component 165 may implement thresholding such that the n-best list of skill components may indicate no more than a maximum number of skill components. In another example, the skill components included in the n-best list of skill components may be limited by a threshold score, where only skill components associated with a likelihood to handle the user input above a certain score are included in the n-best list of skill components.

The ASR output data may correspond to more than one ASR hypothesis. When this occurs, the skill shortlisting component 165 may output a different n-best list of skill components for each ASR hypothesis. Alternatively, the skill shortlisting component 165 may output a single n-best list of skill components representing the skill components that are related to the multiple ASR hypotheses represented in the ASR output data.

As indicated above, the skill shortlisting component 165 may implement thresholding such that an n-best list of skill components output therefrom may include no more than a threshold number of entries. If the ASR output data includes more than one ASR hypothesis, the n-best list of skill components may include no more than a threshold number of entries irrespective of the number of ASR hypotheses output by the ASR component. Additionally or alternatively, the n-best list of skill components may include no more than a threshold number of entries for each ASR hypothesis, e.g., no more than five entries for a first ASR hypothesis, no more than five entries for a second ASR hypothesis, etc.

Additionally or alternatively to making a binary determination regarding whether a skill component potentially relates to the ASR output data, the skill shortlisting component 165 may generate confidence scores representing likelihoods that skill components relate to the ASR output data. The skill shortlisting component 165 may perform matrix vector modification to obtain confidence scores for all skill components in a single instance of processing of the ASR output data.

An n-best list of skill components including confidence scores that may be output by the skill shortlisting component 165 may be represented as, for example:

Story skill component, 0.67
Recipe skill component, 0.62
Information skill component, 0.57
Shopping skill component, 0.42

As indicated, the confidence scores output by the skill shortlisting component 165 may be numeric values. The confidence scores output by the skill shortlisting component 165 may alternatively be binned values (e.g., high, medium, low).

The n-best list of skill components may only include entries for skill components having a confidence score satisfying, e.g., meeting or exceeding, a minimum threshold confidence score. Alternatively, the skill shortlisting component 165 may include entries for all skill components associated with enabled skill components of the current user, even if one or more of the skill components are associated with confidence scores that do not satisfy the minimum threshold confidence score.

The skill shortlisting component 165 may consider other data when determining which skill components may relate to the user input represented in the ASR output data as well as respective confidence scores. The other data may include usage history data, data indicating the skill components that are enabled with respect to the device 110 and/or user 105, data indicating a device type of the device 110, data indicating a speed of the device 110, a location of the device 110, data indicating a skill component that was being used to output content via the device 110 when the device 110 received the instant user input, etc.

The thresholding implemented with respect to the n-best list if skill components generated by the skill shortlisting component 165 as well as the different types of other data considered by the skill shortlisting component 165 are configurable.

The NLU component 160 process the ASR output data with respect to the plurality of skill component identifiers, output by the skill shortlisting component 165 to determine NLU output data including one or more NLU hypotheses. Each NLU hypothesis may be associated with a respective skill component represented in the skill component identifiers output by the skill shortlisting component 165.

The NLU component 160 may perform intent classification (IC) processing on the ASR output data to determine an intent of the user input. An intent corresponds to an action responsive to the user input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in the ASR output data to the words and phrases in an intents database. In some embodiments, the NLU component 160 may communicate with multiple intents databases, with each intents database corresponding to one or more intents associated with a particular skill component.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

The NLU component 160 may also perform named entity recognition (NER) processing on the ASR output data to determine one or more portions, sometimes referred to as slots, of the user input that may be needed for post-NLU processing, e.g., processing performed by a skill component. For example, NER processing of the user input "play [song name]" may determine an entity type of "SongName" and an entity value corresponding to the indicated song name. For further example, NER processing of the user input "call mom" may determine an entity type of "Recipient" and an entity value corresponding to "mom." In another example, NER processing of the user input "what is today's weather" may determine an entity type of "Date" and an entity value of "today."

In some embodiments, an intent may be linked to one or more entity types to be populated with entity values. For example, a <PlayMusic> intent may be associated with an "artist name" entity type, an "album name" entity type, and/or a "song name" entity type.

For example, the NLU component 160 may perform NER processing to identify words in ASR output data as subject, object, verb, preposition, etc. based on grammar rules and/or models. Then, the NLU component 160 may perform IC processing using the identified verb to identify an intent. Thereafter, the NLU component 160 may again perform NER processing to determine the entity type(s) associated with the identified intent. For example, a model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data using heuristic grammar rules, or a model may be constructed using techniques such as hidden Markov models, maximum entropy models, log linear models, conditional random fields (CRFs), and the like. For example, NER processing with respect to a music skill component may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill component, which IC processing determines corresponds to a <PlayMusic> intent.

The NLU component 160 may generate NLU output data including one or more NLU hypotheses, where each NLU hypothesis includes an intent and optionally one or more entity types and corresponding entity values. In some embodiments, a NLU hypothesis may be associated with a score representing a confidence of NLU processing performed to determine the NLU hypothesis with which the score is associated.

The NLU component 160 may also perform domain classification (DC) processing to determine a domain corresponding to the user input. As defined herein above, a "domain" may refer to a collection of related functionality. A domain may be associated with one or more skill components performing related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

In some embodiments, the NLU component 160 may process using a display history, as represented by screen composition plans stored in the display history storage 177, to perform contextual understanding. Such enables the NLU component to understand user inputs such as "do the thing on the right," "tell me more about the left item," etc.

In some embodiments, the NLU component 160 may not limit processing to being performed with respect to only the skill component that output a response to a previous user input. Such configuration of the NLU component 160 enables the NLU component 160 to understand an instant user input referring to displayed content provided by a source other than the aforementioned skill component.

As described above, speech processing may be performed using two different components, i.e., the ASR component 150 and the NLU component 160. In some embodiments, a spoken language understanding (SLU) component may be configured to process audio data to determine NLU output data.

The SLU component may be equivalent to a combination of the ASR component 150 and the NLU component 160. Yet, the SLU component may process audio data and directly determine the NLU output data, without an intermediate step of generating ASR output data. As such, the SLU component may take audio data representing speech and attempt to make a semantic interpretation of the speech. The SLU component may output NLU output data including a most likely NLU hypothesis, or multiple NLU hypotheses associated with respective confidence or other scores (such as probability scores, etc.).

The skill selection component 185 is configured to determine a skill component, or n-best list of skill components each associated with a confidence score/value, to execute to respond to the user input. The skill selection component 185 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the device 110 to output content, e.g., music, video, synthesized speech, etc., when the device 110 captured the user input, one or more skill components that are indicated as enabled in a profile (as stored in the profile storage 170) associated with the user 105, output capabilities of the device 110, a geographic location of the device 110, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule, e.g., each rule corresponding to a different intent capable of being handled by the skill component. In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "PlayVideo" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary, e.g., yes/no, true/false, etc., determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components, e.g., only skill components indicated as enabled in the user profile of the user 105.

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of respond to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 185. For example, such other data may indicate capabilities, e.g., output capabilities or components such as a connected screen, loudspeaker, etc., of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator, e.g., flag, representing a strength of the skill component's ability to personalize its response to the user input.

In some embodiments, a skill component's pre-response may be configured to a pre-defined schema. By requiring pre-responses to conform to a specific schema, e.g., by requiring skill components to only be able to provide certain types of data in pre-responses, new skill components may be onboarded into the skill component selection functionality without needing to reconfigure the skill selection component 185 each time a new skill component is onboarded. Moreover, requiring pre-responses to conform to a schema limits the amount of values needed to be used to train and implement a ML model for ranking skill components.

In some embodiments, a skill component's pre-response may indicate whether the skill component requests exclusive display access, i.e., whether the skill component requests its visual data be presented on an entirety of the display.

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105, e.g., as represented in a user profile or group profile stored in the profile storage 170, NLU confidence scores of the NLU output data, a device type of the device 110, data indicating whether the device 110 was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 105, that a NLU hypothesis corresponding to the skill component is associated with a NLU confidence score satisfying a condition, e.g., a threshold NLU confidence score, that the skill component was outputting content via the device 110 when the device 110 received the user input, etc. Things that may decrease a skill component's ranking include, for example, that the skill component is associated with a pre-response indicating the skill component cannot generate a response that is personalized to the user 105, that a NLU hypothesis corresponding to the skill component is associated with a NLU confidence score failing to satisfy a condition, e.g., a threshold NLU confidence score, etc.

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

A skill component 190 may process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the device 110, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza. In another example, for NLU output data including an <OutputStory> intent and a "title" entity type and corresponding title entity value, a story skill component may output a story corresponding to the title.

A skill component may operate in conjunction between the device 110/system 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

The skill component 190 may process to determine output data responsive to the spoken user input, e.g., based on the intent and entity data as represented in the NLU output data received by the skill component 190. As detailed herein above, the output data may include one or more instances of visual data for display by the device 110.

The TTS component 180 is configured to generate output audio data including synthesized speech. The TTS component 180 may perform speech synthesis using one or more different methods. In one method of synthesis called unit selection, the TTS component 180 matches a database of recorded speech against the data input to the TTS component 180. The TTS component 180 matches the input data against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 180 may match units to the input data to create a natural sounding waveform. The unit database may include multiple examples of phonetic units to provide the TTS component 180 with many different options for concatenating units into speech. One benefit of unit selection is that, depending on the size of the database, a natural sounding speech output may be generated. The larger the unit database, the more likely the TTS component 180 will be able to construct natural sounding speech.

Unit selection speech synthesis may be performed as follows. Unit selection includes a two-step process. First the TTS component 180 determines what speech units to use and then it combines them so that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output, e.g., pitch, prosody, etc. A join cost represents how well a speech unit matches a consecutive speech unit for purposes of concatenating the speech units together in the eventual synthesized speech. The overall cost function is a combination of target cost, join cost, and other costs that may be determined by the TTS component 180. As part of unit selection, the unit selection engine chooses the speech unit with the lowest overall combined cost. For example, a speech unit with a very low target cost may not necessarily be selected if its join cost is high.

In another method of synthesis called parametric synthesis, parameters such as frequency, volume, noise, etc. are varied by the TTS component 180 to create an artificial speech waveform output. Parametric synthesis may use an acoustic model and various statistical techniques to match data, input to the TTS component 180, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 180 may include an acoustic model, or other models, which may convert data, input to the TTS component 180, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 180 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder, i.e., a digital voice encoder, to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 180, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 180 may also calculate potential states for other potential audio outputs, such as various ways of pronouncing phoneme /E/, as potential acoustic matches for the phonetic unit. In this manner multiple states and state transition probabilities may be calculated.

The probable states and probable state transitions calculated by the TTS component 180 may lead to a number of potential audio output sequences. Based on the acoustic model and other potential models, the potential audio output sequences may be scored according to a confidence level of the TTS component 180. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

In some embodiments, the TTS component 180 may be configured to generate synthesized speech corresponding to a response to the user input, as provided by the skill component 190 at step 15a of FIG. 1B, as well as including a summary of the one or more instances of visual supplemental content presented in the visual response described herein.

The profile storage 170 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 2:
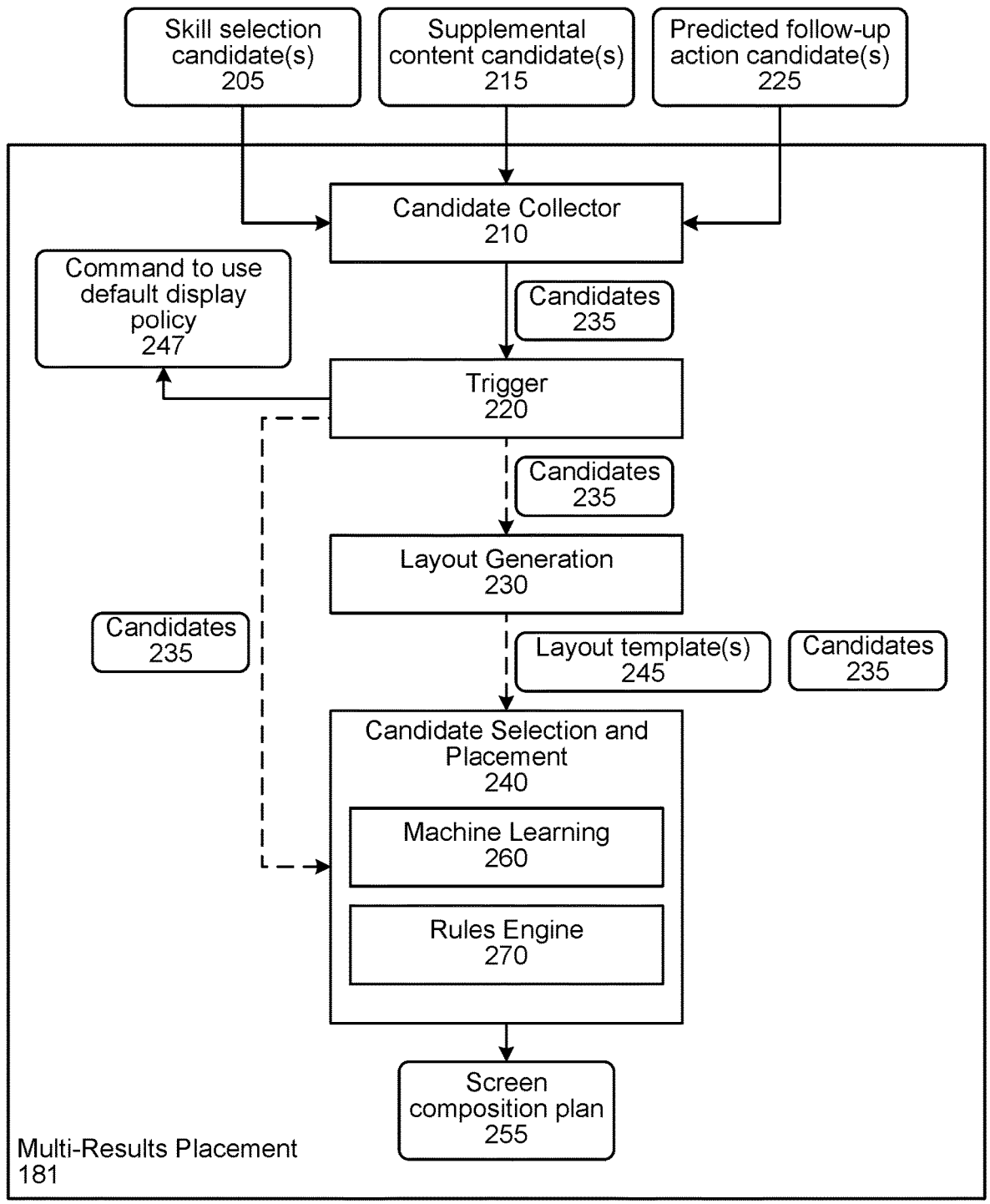
FIG. 2 is a conceptual diagram illustrating a multi-results placement component, according to embodiments of the present disclosure.

Referring to FIG. 2, an example configuration of the multi-results placement component 181 is described. As illustrated, the multi-results placement component 181 may include a candidate collector component 210, a trigger component 220, a layout generation component 230, and a candidate selection and placement component 240.

The candidate collector component 210 is configured to receive various candidates from the orchestrator component 130 (step 10 of FIG. 1). For example, the candidate collector component 210 may receive a skill selection candidate(s) 205, output by the skill selection component 185 at step 9a in FIG. 1B; a supplemental content candidate(s) 215, output by the supplemental content component 155 at step 9b of FIG. 1B; and/or a predicted follow-up action candidate(s) 225, output by the predicted follow-up action component 175 at step 9c of FIG. 1B.

At a minimum, a skill selection candidate may include a skill component identifier corresponding to a skill component configured to process to respond to the user input. A skill selection candidate may also include an intent indicator represented in NLU output data associated with the skill component. A skill selection candidate may also include an indicator representing whether the skill component requests exclusive screen access, i.e., whether the skill component requests its visual data be presented on an entirety of the display of the device 110.

At a minimum, a supplemental content candidate may include a supplement content provider identifier corresponding to a particular supplemental content provider configured to provide supplemental content for output in conjunction with the response to the user input. A supplemental content candidate may also include a requested display placement where the supplemental content should be presented. In some embodiments, a requested display placement may be represented as a placement identifier that the multi-results placement component 181 is configured to map to a particular placement size and position, e.g., "small horizontal bar at the bottom of the screen," "medium size square on the right side of the screen," etc. A supplemental content candidate may also include a placement condition. Example placement conditions include, but are not limited to, "display the supplemental content only if X" and "display the supplemental content if not Y."

At a minimum, a predicted follow-up action candidate may include a predicted follow-up action, e.g., as represented by an intent, and a skill component identifier corresponding to a skill component configured to perform the predicted follow-up action. A predicted follow-up action candidate may also include a requested display placement where an indicator, e.g., text or an image, of the predicted follow-up action should be presented. In some embodiments, a requested display placement may be represented as a placement identifier that the multi-results placement component 181 is configured to map to a particular placement size and position, e.g., "small horizontal bar at the bottom of the screen," "medium size square on the right side of the screen," etc. A predicted follow-up action candidate may include a placement condition. Example placement conditions include, but are not limited to, "display the predicted follow-up action only if X" and "display the predicted follow-up action if not Y."

In some embodiments, the candidate collector component 210 may implement a time budget within which candidates are to be received by the candidate collector component 210. For example, the candidate collector component 210 may be configured to receive one or more additional candidates within a threshold duration of time of receiving a first candidate generated for the instant user input. The duration of the time budget is configurable.

The candidate collector component 210 may send all candidates 235, generated for the instant user input, to the trigger component 220. The candidates 235 may include only those candidates received within the time budget described above.

The trigger component 220 is configured to determine whether multiple instances of visual content, provided by different sources, are to be displayed in response to the instant user input. In some embodiments, the trigger component 220 may be configured as a ML-based trained classifier configured to determine whether multiple instances of visual content are to be displayed, or whether a single instance of visual content, output by a skill component 190 corresponding to a top scoring skill selection candidate, is to be displayed on an entirety of a display of the device 110. In some embodiments, the classifier may be trained using data provided by one or more skill component developers. A skill component developer may provide, to the system 120, a preferred manner in which visual content, output by the skill component associated with the developer, is to be displayed. For example, a skill component developer may indicate that visual content, output by a movie skill component, is to be presented on an entirety of a display. For further example, a skill component developer may indicate that visual content, output by a skill component, is to be presented on an entirety of a display when the top scoring skill selection candidate includes a specific skill component identifier, i.e., corresponds to a particular skill component, and include a particular intent indicator, i.e., corresponds to a particular intent. The classifier may be trained using one or more art-/industry-known ML training techniques.

In some embodiments, the trigger component 220 may implement a contextual bandit ML model configured to learn for which user inputs multiple instances of visual data are to be presented. For example, the contextual bandit ML model may learn that multiple instances of visual data are to be presented when the user input corresponds to an entertainment domain, but not a movie domain.

In machine learning, a multi-armed bandit problem is a problem in which a fixed, limited set of resources must be allocated between competing, alternative choices in a way that maximizes their expected gain, when each choice's properties are only partially known at the time of allocation, and may become better understood as time passes or by allocating resources to the choice. This may also be known as a reinforcement learning problem demonstrating an exploration-exploitation tradeoff dilemma. In some embodiments of the present disclosure, a multi-arm (or k-arm) bandit ML model may be implemented.

In some embodiments, an explore-then-commit (ETC) bandit ML model may be implemented. ETC explores each action (i.e., each arm) a fixed number of times and starts exploiting by always taking the optimal action (as determined up to that point) thereafter. The bandit setting is often stateless with a fixed number of k arms.

Given a number m, the ETC explores each arm m times. The ETC may process until all k arms are enumerated, requiring a total number of m*k exploration arms. Once all reward scores are determined, the reward scores are used to estimate parameters.

In some embodiments, a Thompson sampling heuristic may be used. A Thompson sampling heuristic is used to choose actions that address the exploration-exploitation dilemma in the multi-armed bandit problem, and includes choosing the action that maximizes the expected reward with respect to a randomly drawn belief. In other words, Thompson sampling is a Bayesian approach.

In some embodiments, the contextual bandit ML model may be trained at the individual user level. In some embodiments, the contextual bandit ML model may be trained with respect to a population of users, e.g., corresponding to the same age group, same geographic location, same gender, and/or the like. In some embodiments, features may be considered by the contextual bandit ML model in a hierarchical manner. For example, the contextual bandit ML model may be configured to attribute the most weight to the user input, and less weight to user preferences (as represented in profile data in the profile storage 170) and other extrinsic information, such as time of day, day of week, location, etc. In some embodiments, the contextual bandit ML model may make a determination based at least in part on whether the user 105 is looking at the display of the device 110, and/or whether the user 105 is likely driving.

If the trigger component 220 determines a single instance of visual data is to be presented, the trigger component 220 may output a command 247 to use a default display policy for presenting the single instance of visual data. Conversely, if the trigger component 220 determines multiple instances of visual data are to be presented, the trigger component 220 may send the candidates 235 to the layout generation component 230.

The layout generation component 230 is configured to determine one or more layout templates that are usable to present visual data output by two or more skill components 190 and/or supplemental content providers 183 corresponding to the candidates 235. The layout generation component 230 may determine the one or more layout templates based on various factors, including but not limited to a type/size of the display of the device 110. In some embodiments, a layout template may be associated with a domain, skill component, supplemental content provider, or particular combination thereof, and the layout generation component 230 may determine the one or more layout templates based at least in part on the domain(s), skill component(s), and/or supplement content provider(s) corresponding to or represented in the candidates 235.

In some embodiments, a layout template may be a modular grid. For example, a layout template may be a modular grid representing one instance of visual content is to be presented on an entirety of a display, and another instance of visual content is to be presented as a small inlet at a corner of the display. For further example, a layout template may be a modular grid representing two instances of visual content are to be presented side-by-side as equally sized contents. Other examples are possible and within the scope of the present disclosure.

In some embodiments, a layout template may be configured for presenting visual data provided by two or more skill components represented in the skill selection candidates 205. In some embodiments, a layout template may be configured for presenting visual data that indicates to the user that a response to the instant user input is ambiguous. For example, in response to the user input "Alexa, play [item name]," a layout template may be used to present two or more of visual data output from a movie skill component, visual data output by a music skill component, and visual data output by an audio book skill component. In some embodiments, a layout template may be configured to presenting visual data configured to enable to a user to further explore a topic. For example, in response to the user input "Alexa, what can I do in Seattle this weekend," a layout template may be used to present visual data output by an events skill component, and visual data output by a restaurants skill component. In some embodiments, a layout template may be configured for presenting visual data configured to inform the user of functionality provided by the system 120. For example, in response to the user input "Alexa, what does a tiger sound like," a layout template may be used to display an image of a tiger output by a skill component, and may also be used to simultaneously display one or more icons for one or more animal sound skill components, as provided by the skill components or one or more supplemental content providers.

The layout generation component 230 may send, to the candidate selection and placement component 240, the candidates 235 and one or more layout templates 245 usable to present visual data provided by a skill component(s) and/or supplemental content provider(s) represented in the candidates 235.

The candidate selection and placement component 240 is configured to determine a screen composition plan for presenting visual data in a beneficial layout. The candidate selection and placement component 240 may include a machine learning (ML) component 260 and/or a rules engine 270. The ML component 260 may implement a ML model configured to maximize a goal metric.

Figure 3:
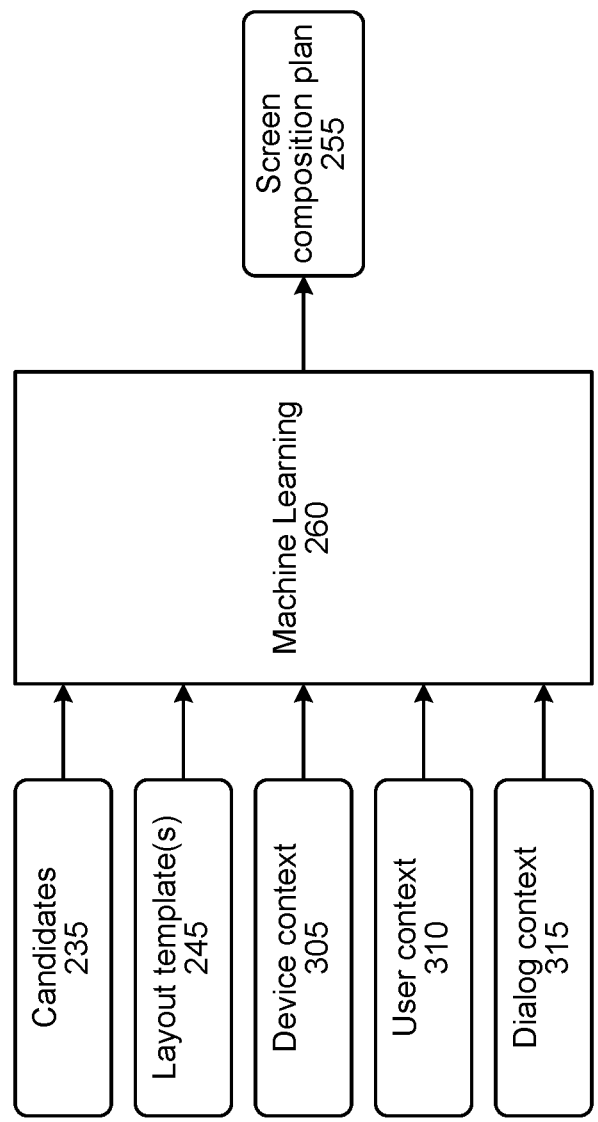
FIG. 3 is a conceptual diagram of a machine learning (ML) component of the multi-results placement component, according to embodiments of the present disclosure.

As illustrated in FIG. 3, the ML component 260 generate a screen composition plan data 255 including one or more screen composition plans, where each screen composition plan includes a portion of the candidates 235 to provide visual data for the screen composition plan, and data representing how the visual data is to be presented, e.g., size and placement. The ML component 260 may take as input various data such as, but not limited to, the candidates 235, the layout template(s) 245; device context data 305, e.g., representing a device type of the device 110, a screen size of the display of the device 110, whether the display is a touchscreen, etc.; user context data 310, e.g., user preferences represented in the profile storage 170, a history of interactions of the user 105 with the system 120, etc.; and/or dialog context data 315 relating to a present dialog between the user 105 and the system 120, e.g., includes NLU output data representing one or more previous user inputs of the dialog, and one or more output data corresponding to the one or more previous inputs. In some embodiments, the ML component 260 may determine a plurality of screen composition plans, and the plurality of screen composition plans may be represented in the screen composition plan data 255.

In some embodiments, the multi-results placement component 181 may not include the layout generation component 230. In some embodiments, the multi-results placement component 181 may include the layout generation component 230, but the layout generation component 230 may not be invoked in every instance. In the foregoing embodiments, the trigger component 220 may send the candidates 235 to the candidate selection and placement component 240. It will be appreciated that, in such embodiments, the ML component 260 may not receive and process a layout template(s) 245 and, as a result, the ML component 260 may determine sizing, position, and/or other layout configurations for how the candidates, represented in the screen composition plan, are to be presented.

In some embodiments, the ML component 260 may implement a contextual bandit ML model. The contextual bandit ML Model, of the ML component 260, may learn what visual content is to be presented together, and how the visual content is to be presented. For example, in the beginning, the contextual bandit ML model may determine a two-part layout is to be used, where the two-part layout includes a left portion and a right portion for displaying visual contents. Over time, the contextual bandit ML model may occasionally determine a layout including a different number of portions of displaying visual contents and/or different sizing of the portions. As the system 120 accumulates signals representing user engagement with displayed visual content output based on decisions of the contextual bandit ML model, the contextual bandit ML model may use the signals to optimize decisions of the contextual bandit ML model. Example signals representing user engagement include, but are not limited to, touch-based user inputs interacting with displayed content, voice-based user inputs relating to displayed content, etc.

In some embodiments, the contextual bandit ML model may be trained at the individual user level. In some embodiments, the contextual bandit ML model may be trained with respect to a population of users, e.g., corresponding to the same age group, same geographic location, same gender, and/or the like.

In some embodiments, features may be considered by the contextual bandit ML model in a hierarchical manner. For example, the contextual bandit ML model may be configured to attribute the most weight to the user input, and less weight to user preferences (as represented in profile data in the profile storage 170) and other extrinsic information, such as time of day, day of week, location, etc.

Referring again to FIG. 2, the rules engine 270 may include rules for overriding decisions made by the ML component 260. For example, the rules engine 270 may implement a rule that when a top scoring skill selection candidate, represented in the candidates 235, indicates the user input corresponds to a particular domain, the visual data, output by the skill component corresponding to the top scoring skill selection candidate, is to be presented on an entirety of the display, and a multi-visual content layout should not be used.

In some embodiments, the system 120 may be configured to determine whether the system 120 receives additional user inputs as a result of a rule implemented by the rules engine 270. In other words, the system 120 may determine whether output of visual data, according to a rule implemented by the rules engine 270, results in increased user engagement. If the system 120 determines implementation of the rule does not result in increased user engagement, the system 120 may determine the rule should no longer be implemented.

The candidate selection and placement component 240 may output a screen composition plan data 255. The screen composition plan data 255 may include one or more screen composition plans, where each screen composition plan includes two or more candidates from the candidates 235, and data representing how the two or more candidates how visual data, from the two or more candidates, are to be presented. In some embodiments, one of the candidates, included in a screen composition plan2, may be a top scoring candidate of the skill selection candidates 205. The screen composition plan data 255 may be sent to the orchestrator component 130 as described above with respect to step 11 of FIG. 1B.

Figure 4:
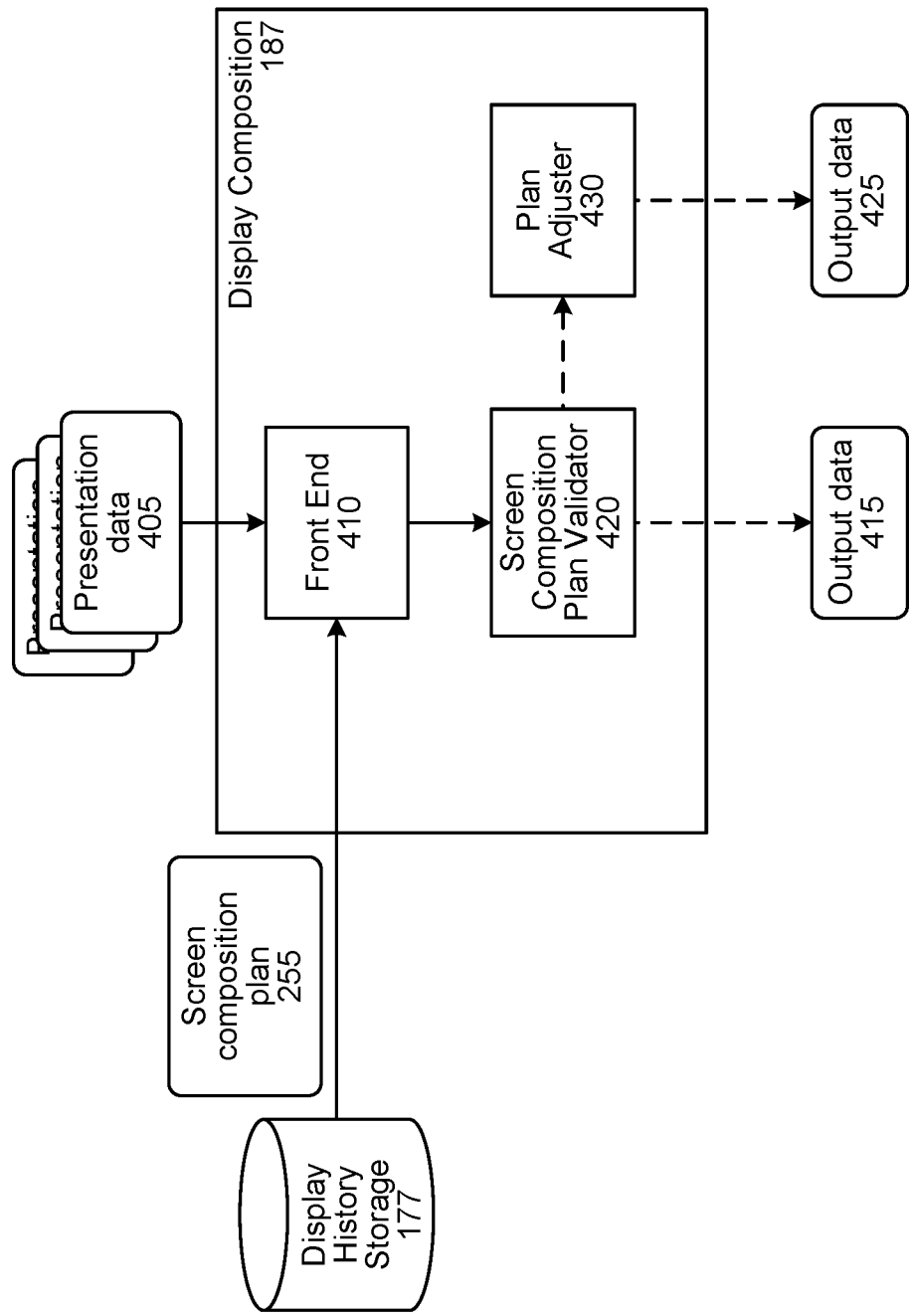
FIG. 4 is a conceptual diagram illustrating a display composition component, according to embodiments of the present disclosure.

Referring to FIG. 4, an example configuration of the display composition component 187 is described. The display composition component 187 may include a front end component 410, a screen composition plan validator component 420, and a plan adjuster component 430.

The front end component 410 may receive instances of presentation data 405 output by the skill component(s) 190 and optionally the supplemental content provider(s) 183. Such is represented in FIG. 1B as steps 15a and 15b. In response to receiving the instances of presentation data 405, the front end component 410 may query the display history storage 177 for the screen composition plan data 255 output by the multi-results placement component 181. For example, the instances of presentation data 405 may be associated with a user input identifier corresponding to the instant user input, and the front end component 410 may query the display history storage 177 for screen composition plan data 255 associated with the user input identifier.

In some embodiments, the front end component 410 may implement a time budget within which presentation data 405 is to be received. For example, the front end component 410 may be configured to receive one or more additional instances of visual data within a threshold duration of time of receiving a first instance of visual data generated for the instant user input. The duration of the time budget is configurable. If the front end component 410 does not receive a candidate within the time budget, the front end component 410 may determine the provider, of the additional visual data, is unable to provide the visual data.

The front end component 410 sends the presentation data 405 and the screen composition plan data 255 to the screen composition plan validator component 420.

The screen composition plan validator component 420 is configured to validate the presentation data 405 against one or more screen composition plans represented in the screen composition plan data 255. In other words, the screen composition plan validator component 420 is configured to determine whether the presentation data 405 is received from the sources, i.e., skill component(s) 190 and/or supplement content provider(s) 183, indicated in a screen composition plan2, and determine whether the presentation data 405 is sized for presentment according to the screen composition plan2. Moreover, the screen composition plan validator component 420 may determine whether the presentation data 405 corresponds to all visual data to be presented using the screen composition plan2.

The screen composition plan validator component 420 may generate output data 415 if the screen composition plan validator component 420 is able to validate a top scoring screen composition plan represented in the n-best list of screen composition plans in the screen composition plan data 255, e.g., is able to determine the presentation data 405 is received from the sources, i.e., skill component(s) 190 and/or supplement content provider(s) 183, indicated in the top scoring screen composition plan2, determine the presentation data 405 is sized for presentment according to the top scoring screen composition plan2, and determine the presentation data 405 corresponds to all visual data to be presented using the top scoring screen composition plan2. The output data 415 may include the 2 instances of presentation data 405 to be displayed, and the data, from the screen composition plan, representing how the instances of presentation data 405 are to be presented. The output data 415 may be sent to the device 110 at step 17 in FIG. 1B.

Conversely, the screen composition plan validator component 420 may invoke the plan adjuster component 430 if the screen composition plan validator component 420 is unable to validate the top scoring screen composition plan against the received presentation data. The screen composition plan validator component 420 may invoke the plan adjuster component 430 by sending, to the plan adjuster component 430, the screen composition plan data 255 and the instances of presentation data 405.

The plan adjuster component 430 is configured to select another screen composition plan, from the screen composition plan data 255, for presenting one or more instances of visual content to the user 105. For example, the plan adjuster component 430 may determine another screen composition plan that can be validated using the received instances of presentation data 405. For example, the plan adjuster component 430 may determine a first supplemental content provider did not provide (e.g., with a time budget) visual data for presenting according to the top scoring screen composition plan, but may determine a second supplemental content provider provided visual data for presenting according to another screen composition plan. The plan adjuster component 430 may generate output data 425. If the plan adjuster component 430 is able to validate another screen composition plan, the output data 425 may include the validated instances of presentation data 405, and data, from validated screen composition plan, representing how the instances of presentation data 405 are to be presented. If the plan adjuster component 430 is unable to validate another screen composition plan in the screen composition plan data 255, the plan adjuster component 430 may generate the output data 425 to include the visual data responding to the user input, and data representing either: the visual data is to be presented on an entirety of a display; or the visual data is to be presented on a portion of the display and the remainder of the display is to include a background image or video. The output data 415 may be sent to the device 110 at step 17 in FIG. 1B.

Figure 5:
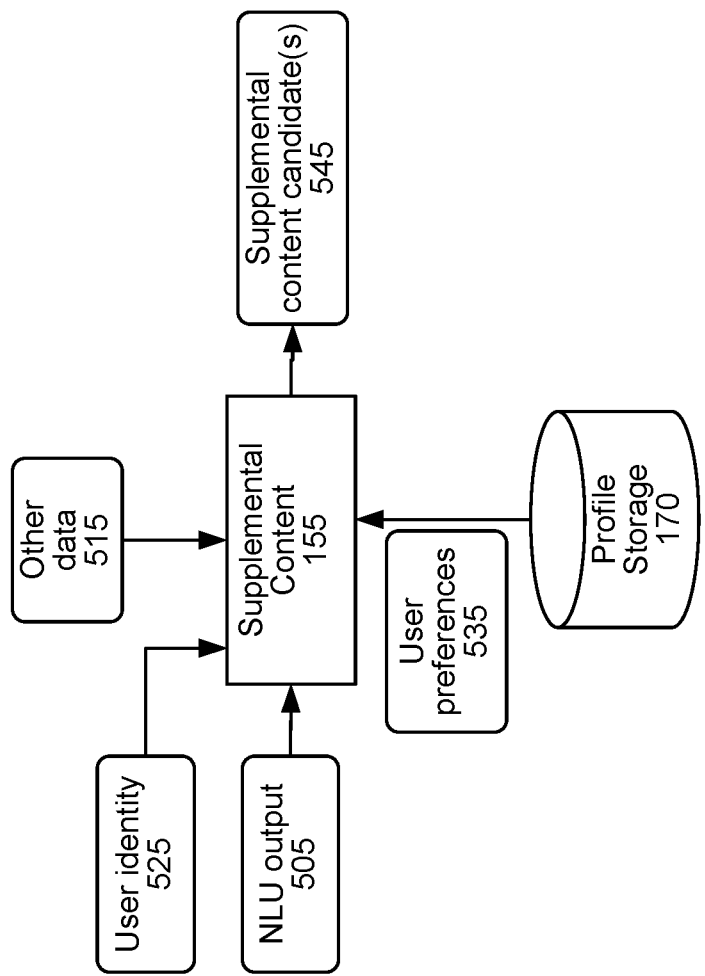
FIG. 5 is a conceptual diagram illustrating how a supplemental content component may process data, according to embodiments of the present disclosure.

Referring to FIG. 5, example processing of the supplemental content component 155 is described. When the supplemental content component 155 receives NLU output data 505 at step 8b of FIG. 1B, the supplemental content component 155 may determine whether supplemental content, associated with but not directly responsive to the user input, should be output.

The supplemental content component 155 may base its determinations at least in part on non-user specific data, such as supplemental content provider-provided data, system generated intent pairs, etc.

The supplemental content component 155 may determine whether supplemental content should be output based on data provided to the system 120 by a skill component. Such data is represented as other data 515. A skill component may provide the system 120 with data indicating that any time the NLU output data 505 indicates a particular intent, the supplemental content component 155 should solicit the skill component as to whether the skill component has supplemental content that may be output. For example, a concert ticket skill component may provide the system 120 with data indicating that anytime the NLU output data 505 indicates a <PlayMusic> intent, the supplemental content component 155 should solicit the concert ticket skill component as to whether the concert ticket skill component has access to information indicating a concert put on by a resolved artist entity represented in the NLU output data 505. For further example, an electronic calendar skill component may provide the system 120 with data indicating that anytime the NLU output data 505 indicates an <OutputTime> intent, the supplemental content component 155 should solicit the electronic calendar skill component as to whether the electronic calendar skill component has calendar entries associated with an electronic calendar associated with the device 110 and/or user 105. Yet further, for example, a traffic report skill component may provide the system 120 with data indicating that anytime the NLU output data 505 indicates a <BookRide> intent, the supplemental content component 155 should solicit the traffic report skill component to provide current traffic report information.

The supplemental content component 155 may also determine whether supplemental content should be output based on the intent represented in the NLU output data 505. The system 120 may store intent pair data (illustrated as other data 515) corresponding to pairs of intents. Each pair of intents may be associated with a respective score representing a likelihood that a second intent of the pair will be invoked by a user within a time threshold subsequent to content responsive to the first intent being output. The scores of various intent pairs may be normalized. The intent pair data may be untailored with respect to any given user of the system 120. For example, the intent pair data may include the following intent pairs with corresponding scores:

[0.345]<GetWeather>; <GetTraffic>
[0.217]<OrderPizza>; <PlayMovie>
[0.121]<PlayMusic>; <SetVolume>

The intent pair data may be configured based solely upon the natures of the intents. For example, a pair of intents may include a <PlayMusic> intent and a <ChangeVolume> intent. The pair of intents may be associated with a score representing a likelihood that a user may input a first user input corresponding to the <PlayMusic> intent immediately prior to the user inputting a second user input corresponding to the <ChangeVolume> intent based solely on the <PlayMusic> intent and the <ChangeVolume> intent both relating to output of audio from the system 120. For further example, a pair of intents may include a <BookPlaneTicket> intent and a <GetWeather> intent. This pair of intents may be associated with a score indicating a likelihood that users who by plane tickets often ask about the weather for their destination.

Intents may also be paired based on system usage history associated with various different users of the system 120. Pairing of the intents may be skill component agnostic. Thus, both the first intent and the second intent of a pair of intents may be associated with a single skill component, or the first intent of the pair may be associated with a first skill component while the second intent of the pair may be associated with a second skill component. For example, a pair of intents may include a <PlayMusic> intent and a <ChangeVolume> intent, where both the <PlayMucic> intent and the <Change Volume> intent correspond to a music skill component. For further example, a pair of intents may include a <BookPlaneTicket> intent and a <GetWeather> intent, where the <BookPlaneTicket> intent corresponds to a booking skill component and the <GetWeather> intent corresponds to a weather skill component. Pairing of the intents may also be agnostic with respect to the 1P or 3P nature of the skill components associated with the intents. That is, both of the intents of a pair may be associated with one or more 1P skill components implemented by the system 120, both of the intents of a pair may be associated with one or more 3P skill components in communication with the system 120, or a first intent of a pair may be associated with a 1P skill component while the second intent of the pair is associated with a 3P skill component. For example, a pair of intents may include a <PlayMusic> intent and a <ChangeVolume> intent, where both the <PlayMusic> intent and the <Change Volume> intent are executed by a 1P skill component. For further example, a pair of intents may include a <PlayMusic> intent and a <ChangeVolume> intent, where both the <PlayMusic> intent and the <Change Volume> intent are executed by a 3P music skill component. For further example, a pair of intents may include a <BookPlaneTicket> intent and a <PlayMusic> intent, where the <BookPlaneTicket> intent is executed by a 3P skill component and the <PlayMusic> intent is executed by a 1P skill component.

The intent pair data may alternatively be user-specific. For example, if a user routinely invokes a <ChangeVolume> intent subsequent to a <PlayMusic> intent, the system 120 may increase the score associated with a pair of intents corresponding to these intents. Conversely, if the user rarely invokes the <ChangeVolume> intent subsequent to the <PlayMusic> intent, the system 120 may decrease the score associated with a pair of intents correspond to these intents.

The supplemental content component 155 may also base its determinations at least in part on present user input originating user-specific data. Each user may have a different tolerance regarding how many times supplemental content is output in a given period of time, what kinds of supplemental content are output, as well as how supplemental content is presented.

The supplemental content component 155 may receive user identity data 525 from the user recognition component of the system 120. The user identity data 525 may indicate the present user input originating user 105, e.g., include a user identifier of the user 105. The supplemental content component 155 may query the profile storage 170 for user preferences data 535 associated with the user identify data 525 in the profile storage 170, and may use the user preferences data 535 to determine whether supplemental content should be output.

If the supplemental content component 155 determines supplemental content should be output, the supplemental content component 155 generates one or more supplemental content candidates 545 as described herein above with respect to FIG. 1B, and sends the supplemental content candidate(s) 545 to the orchestrator component 130, as described with respect to step 9b of FIG. 1B.

Figure 6:
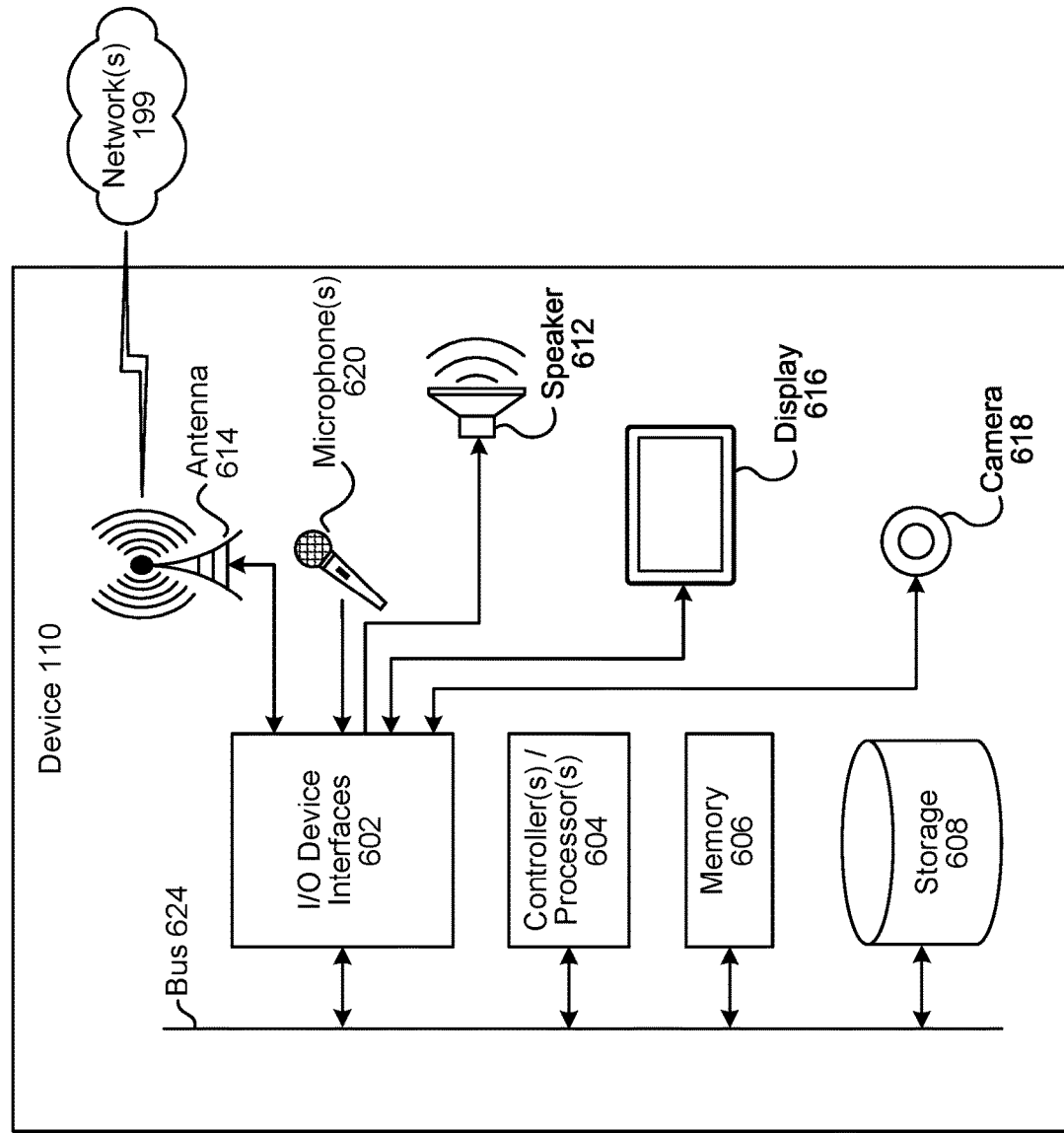
FIG. 6 is a block diagram conceptually illustrating example components of a device, according to embodiments of the present disclosure.
Figure 7:
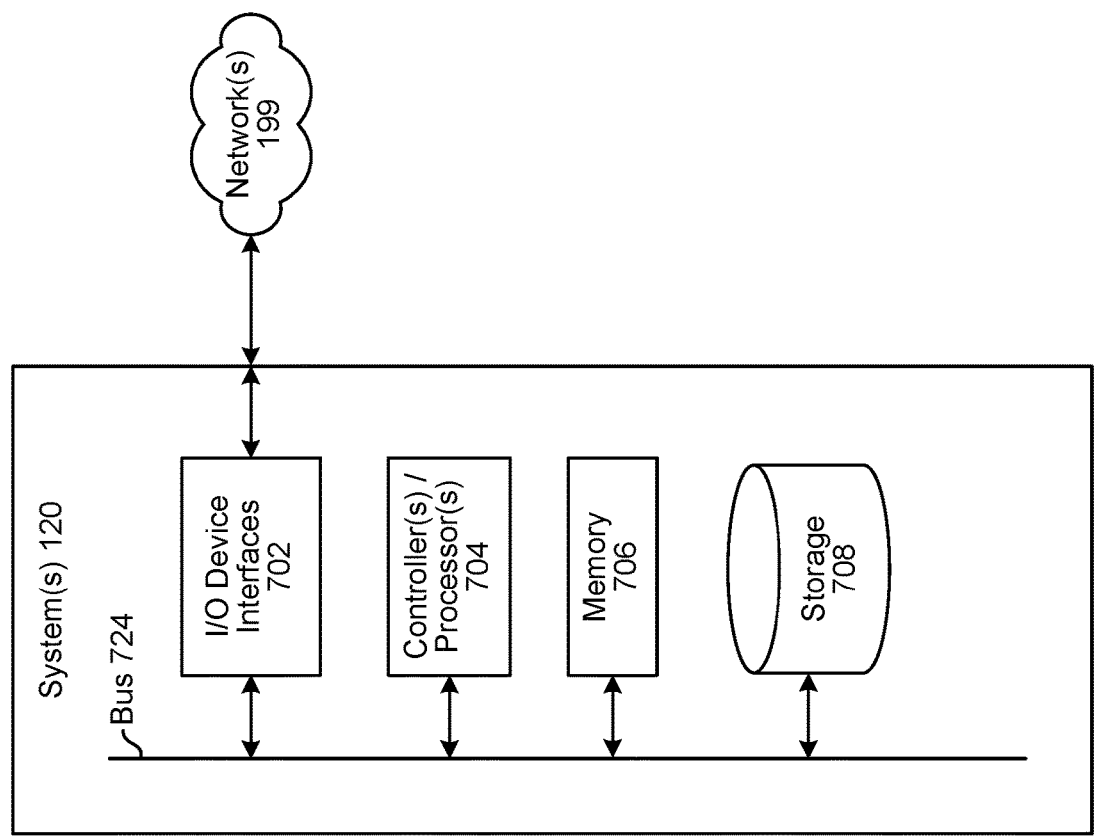
FIG. 7 is a block diagram conceptually illustrating example components of a system, according to embodiments of the present disclosure.

FIG. 6 is a block diagram conceptually illustrating a device 110 that may be used with the system 120. FIG. 7 is a block diagram conceptually illustrating example components of a remote device, such as the system 120, which may assist with ASR processing, NLU processing, etc.; and a skill component. The system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems 120 may be included in the system 100 of the present disclosure, such as one or more systems 120 for performing ASR processing, one or more systems 120 for performing NLU processing, and one or more skill components, etc. In operation, each of these systems may include computer-readable and computer-executable instructions that reside on the respective system 120, as will be discussed further below.

Each of these devices (110/120) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120) may also include a data storage component (608/708) for storing data and controller/processor-executable instructions. Each data storage component (608/708) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces (602/702), as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device 110, the system 120, and/or a skill component may include their own dedicated processors, memory, and/or storage. Alternatively, one or more of the components of the device 110, the system 120, and/or a skill component may utilize the I/O interfaces (602/702), processor(s) (604/704), memory (606/706), and/or storage (608/708) of the device(s) 110, system 120, or the skill component, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill component, as described herein, are illustrative, and may be located as a stand-alone device or may be included, in whole or in part, as a component of a larger device or system.

Figure 8:
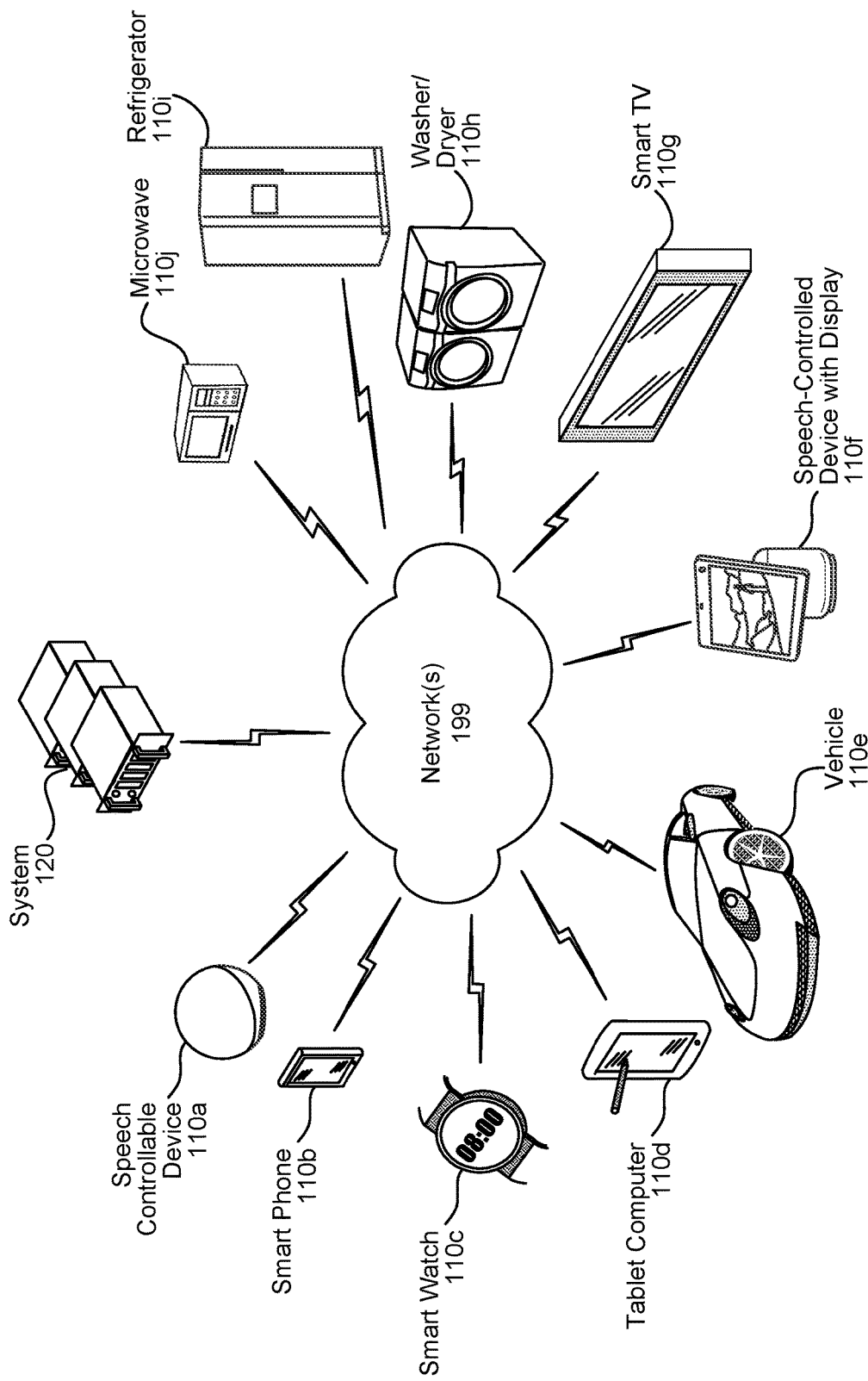
FIG. 8 illustrates an example of a computer network for use with the overall system, according to embodiments of the present disclosure.

As illustrated in FIG. 8, multiple devices (110*a*-110*j*, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 110*a*, a smart phone 110*b*, a smart watch 110*c*, a tablet computer 110*d*, a vehicle 110*e*, a speech-controlled device 110*f* with a display, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill component in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computing system comprising:
   at least one processor; and
   at least one memory comprising instructions that, when executed by the at least one processor, cause the computing system to:
   receive, from a first device including a display, first input audio data corresponding to a first spoken user input;
   determine first natural language understanding (NLU) output data representing the first spoken user input, the first NLU output data including a first intent corresponding to the first spoken user input;
   determine, using a machine learning (ML) model, that:
     a first skill component is to determine a first response to the first spoken user input, where the first response corresponds to a first domain, and
     determine a second skill component is to determine first supplemental content related to the first spoken user input, wherein the first supplemental content corresponds to a second domain different from the first domain;
   receive, from the first skill component, first image data corresponding to the first response;
   receive, from the second skill component, second image data corresponding to the first supplemental content; and
   send, to the first device, a first command to present the first image data and the second image data.

2. The computing system of claim 1, wherein the at least one memory further comprises instructions that, when executed by the at least one processor, further cause the computing system to:
   receive, from the first device, second input audio data corresponding to a second spoken user input;
   determine second NLU output data representing the second spoken user input, the second NLU output data including a second intent corresponding to the second spoken user input;
   determine, using the ML model, that:
     a third skill component is to determine a second response to the second spoken user input, and
     determine the second skill component is to determine second supplemental content related to the second spoken user input;
   receive, from the third skill component, third image data corresponding to the second response, the third image data configured to be presented on an entirety of the display of the first device;
   receive, from the third skill component, fourth image data corresponding to the second response, the fourth image data configured to be presented on a portion of the display of the first device;
   receive, from the second skill component, fifth image data corresponding to the second supplemental content;
   determine, using a rules engine, that the third image data is to be presented; and based at least in part on the rules engine determining the third image data is to be presented, send, to the first device, a second command to present the third image data.

3. The computing system of claim 1, wherein the ML model determines the first skill component and the second skill component based on processing:
 device context data corresponding to the first device, the device context data representing at least one characteristic of the display;
 user context data representing at least one user preference for presenting visual outputs of multiple skill components; and
 dialog context data representing at least a second spoken user input and corresponding system output included in a same dialog as the first spoken user input.

4. The computing system of claim 1, wherein the ML model determines the first skill component and the second skill component based on data representing a user input received in response to a previous visual output including content generated by a plurality of skill components.

5. A computing system comprising:
 at least one processor; and
 at least one memory comprising instructions that, when executed by the at least one processor, cause the computing system to:
  receive first input data corresponding to a first user input;
  determine, using a machine learning (ML) model, that:
   a first skill component is to determine a first response to the first user input, and
   a second skill component is to determine first supplemental content related to the first user input;
  receive, from the first skill component, first image data corresponding to the first response;
  receive, from the second skill component, second image data corresponding to the first supplemental content; and
  send, to a first device including a display, a first command to present the first image data and the second image data.

6. The computing system of claim 5, wherein the at least one memory further comprises instructions that, when executed by the at least one processor, further cause the computing system to:
 receive second input data corresponding to a second user input;
 determine, using the ML model, that:
  a third skill component is to determine a second response to the second user input, and
  the second skill component is to determine second supplemental content related to the second user input;
 receive, from the third skill component, third image data corresponding to the second response, the third image data configured to be presented on an entirety of the display of the first device;
 receive, from the third skill component, fourth image data corresponding to the second response, the fourth image data configured to be presented on a portion of the display of the first device;
 receive, from the second skill component, fifth image data corresponding to the second supplemental content;
 determine, using a rules engine, that the third image data is to be presented; and based at least in part on the rules engine determining the third image data is to be presented, send, to the first device, a second command to present the third image data.

7. The computing system of claim 5, wherein the at least one memory further comprises instructions that, when executed by the at least one processor, further cause the computing system to:
 receive second input data corresponding to a second user input;
 determine, using the ML model, that:
  the first skill component is to determine a second response to the second user input, and
  the second skill component is to determine second supplemental content related to the second user input;
 receive, from the first skill component, third image data corresponding to the second response, the third image data configured to be presented on an entirety of the display;
 receive, from the first skill component, fourth image data corresponding to the second response, the fourth image data configured to be presented on a portion of the display;
 determine the second skill component is unable to provide image data corresponding to the second supplemental content; and
 based at least in part on determining the second skill component is unable to provide image data corresponding to the second supplemental content, send, to the first device, a second command to present the third image data.

8. The computing system of claim 5, wherein the at least one memory further comprises instructions that, when executed by the at least one processor, further cause the computing system to:
 receive second input data corresponding to a second user input;
 determine, using the ML model, that:
  the first skill component is to determine a second response to the second user input,
  the second skill component is to determine second supplemental content related to the second user input, and
  a third skill component is to determine third supplemental content related to the second user input;
 receive, from the first skill component, third image data corresponding to the second response;
 determine the second skill component is unable to provide image data corresponding to the second supplemental content;
 receive, from the third skill component, fourth image data corresponding to the third supplemental content;
 determine, based at least in part on determining the second skill component is unable to provide image data corresponding to the second supplemental content, that the third supplemental content is to be presented; and
 send, to the first device, a second command to present the third image data and the fourth image data.

9. The computing system of claim 5, wherein the ML model determines the first skill component and the second skill component based on processing:
 device context data corresponding to the first device, the device context data representing at least one characteristic of the display;

user context data representing at least one user preference for presenting visual outputs of multiple skill components; and dialog context data representing at least a second user input and corresponding system output included in a same dialog as the first user input.

10. The computing system of claim 5, wherein the ML model determines the first skill component and the second skill component based on data representing a user input received in response to a previous visual output including content generated by a plurality of skill components.

11. The computing system of claim 5, wherein the first image data is configured to be presented on a portion of the display, and wherein the at least one memory further comprises instructions that, when executed by the at least one processor, further cause the computing system to:

receive, from the first skill component, third image data corresponding to the first response to the first user input, the third image data configured to be presented on an entirety of the display.

12. The computing system of claim 5, wherein the at least one memory further comprises instructions that, when executed by the at least one processor, further cause the computing system to:

perform text-to-speech (TTS) processing to generate audio data including synthesized speech, wherein the synthesized speech includes:
a first portion corresponding to a natural language output responsive to the first user input, and
a second portion corresponding to a summary of the first supplemental content; and
send, to the first device, a second command to output the synthesized speech.

13. A computer-implemented method comprising:
receiving first input data corresponding to a first user input;
determining, using a machine learning (ML) model, that:
a first skill component is to determine a first response to the first user input, and
a second skill component is to determine first supplemental content related to the first user input;
receiving, from the first skill component, first image data corresponding to the first response;
receiving, from the second skill component, second image data corresponding to the first supplemental content; and
sending, to a first device including a display, a first command to present the first image data and the second image data.

14. The computer-implemented method of claim 13, further comprising:
receiving second input data corresponding to a second user input;
determining, using the ML model, that:
a third skill component is to determine a second response to the second user input, and
the second skill component is to determine second supplemental content related to the second user input;
receiving, from the third skill component, third image data corresponding to the second response, the third image data configured to be presented on an entirety of the display of the first device;
receiving, from the third skill component, fourth image data corresponding to the second response, the fourth image data configured to be presented on a portion of the display of the first device;
receiving, from the second skill component, fifth image data corresponding to the second supplemental content;
determining, using a rules engine, that the third image data is to be presented; and
based at least in part on the rules engine determining the third image data is to be presented, sending, to the first device, a second command to present the third image data.

15. The computer-implemented method of claim 13, further comprising:
receiving second input data corresponding to a second user input;
determining, using the ML model, that:
the first skill component is to determine a second response to the second user input, and
the second skill component is to determine second supplemental content related to the second user input;
receiving, from the first skill component, third image data corresponding to the second response, the third image data configured to be presented on an entirety of the display;
receiving, from the first skill component, fourth image data corresponding to the second response, the fourth image data configured to be presented on a portion of the display;
determining the second skill component is unable to provide image data corresponding to the second supplemental content; and
based at least in part on determining the second skill component is unable to provide image data corresponding to the second supplemental content, sending, to the first device, a second command to present the third image data.

16. The computer-implemented method of claim 13, further comprising:
receiving second input data corresponding to a second user input;
determining, using the ML model, that:
the first skill component is to determine a second response to the second user input,
the second skill component is to determine second supplemental content related to the second user input, and
a third skill component is to determine third supplemental content related to the second user input;
receiving, from the first skill component, third image data corresponding to the second response;
determining the second skill component is unable to provide image data corresponding to the second supplemental content;
receiving, from the third skill component, fourth image data corresponding to the third supplemental content;
determining, based at least in part on determining the second skill component is unable to provide image data corresponding to the second supplemental content, that the third supplemental content is to be presented; and
sending, to the first device, a second command to present the third image data and the fourth image data.

17. The computer-implemented method of claim 13, wherein the ML model determines the first skill component and the second skill component based on processing:
device context data corresponding to the first device, the device context data representing at least one characteristic of the display;

user context data representing at least one user preference for presenting visual outputs of multiple skill components; and dialog context data representing at least a second user input and corresponding system output included in a same dialog as the first user input.

18. The computer-implemented method of claim 13, wherein the ML model determines the first skill component and the second skill component based on data representing a user input received in response to a previous visual output including content generated by a plurality of skill components.

19. The computer-implemented method of claim 13, wherein the first image data is configured to be presented on a portion of the display, and wherein the computer-implemented method further comprises:

receiving, from the first skill component, third image data corresponding to the first response to the first user input, the third image data configured to be presented on an entirety of the display.

20. The computer-implemented method of claim 13, further comprising:

performing text-to-speech (TTS) processing to generate audio data including synthesized speech, where the synthesized speech includes:
 a first portion corresponding to a natural language output responsive to the first user input, and
 a second portion corresponding to a summary of the first supplemental content; and sending, to the first device, a second command to output the synthesized speech.

* * * * *